United States Patent [19]
Reilly et al.

[11] 3,894,454
[45] July 15, 1975

[54] METHOD AND APPARATUS FOR HANDLING AND TRIMMING BLOW MOLDED ARTICLES

[75] Inventors: Joseph R. Reilly, Naugatuck; Lars G. Schon, Bloomfield, both of Conn.

[73] Assignee: Monsanto Company, St. Louis, Mo.

[22] Filed: May 6, 1974

[21] Appl. No.: 467,378

[52] U.S. Cl. ............................ 82/47; 82/48; 82/101
[51] Int. Cl. ........ B23b 1/00; B23b 7/00; B23b 3/04
[58] Field of Search .......... 82/46, 47, 48, 70.1, 101

[56] References Cited
UNITED STATES PATENTS

| | | | |
|---|---|---|---|
| 3,406,598 | 10/1968 | Doucet | 82/46 |
| 3,429,211 | 2/1969 | Pelot | 82/46 |
| 3,653,285 | 4/1972 | Yoshikawa et al. | 82/101 |
| 3,659,486 | 5/1972 | Criss et al. | 82/101 |
| 3,662,633 | 5/1972 | Bourgeols | 82/46 |
| 3,675,521 | 7/1972 | Ziegler | 82/101 |
| 3,795,162 | 3/1974 | Jaeger | 83/23 |
| 3,800,638 | 4/1974 | Duikens et al. | 82/101 |
| 3,818,785 | 6/1974 | Wakabayashi | 82/48 |

*Primary Examiner*—Harrison L. Hinson
*Attorney, Agent, or Firm*—Michael J. Murphy

[57] ABSTRACT

In apparatus for deflashing thermoplastic articles which includes an edge member for slicing through the flash and guide means for the articles during slicing, there is provided temperature sensing control means upstream of the edge member, a rotating screw and adjacent support bar for delivering the articles to the guide means, a retractable support bar section and reciprocable plunger operable in response to a signal from the temperature sensing control means, and individual deflashed article carrier assemblies linearly moving beneath the edge member. The process involves supplying untrimmed thermoplastic blow molded articles, such as preforms, having in the region of a neck moil and the rest of each preform a cool outer skin at a temperature approaching the surface temperature of the blow mold cavity and an inner wall between the skin temperature and the extrusion temperature, sequentially advancing such untrimmed preforms toward a deflashing station while allowing the thermoplastic in such region to partially equilibrate in temperature through the full wall, sensing the surface temperature in such region upstream of the deflashing station and determining whether it is within a predetermined range with respect to the glass transition temperature of the thermoplastic material, ejecting untrimmed preforms whose surface temperature is outside this range, slicing through the thermoplastic in said region of non-ejected preforms in the deflashing station to remove the moils and then catching them in holders as they fall by gravity after removal of the moils.

25 Claims, 8 Drawing Figures

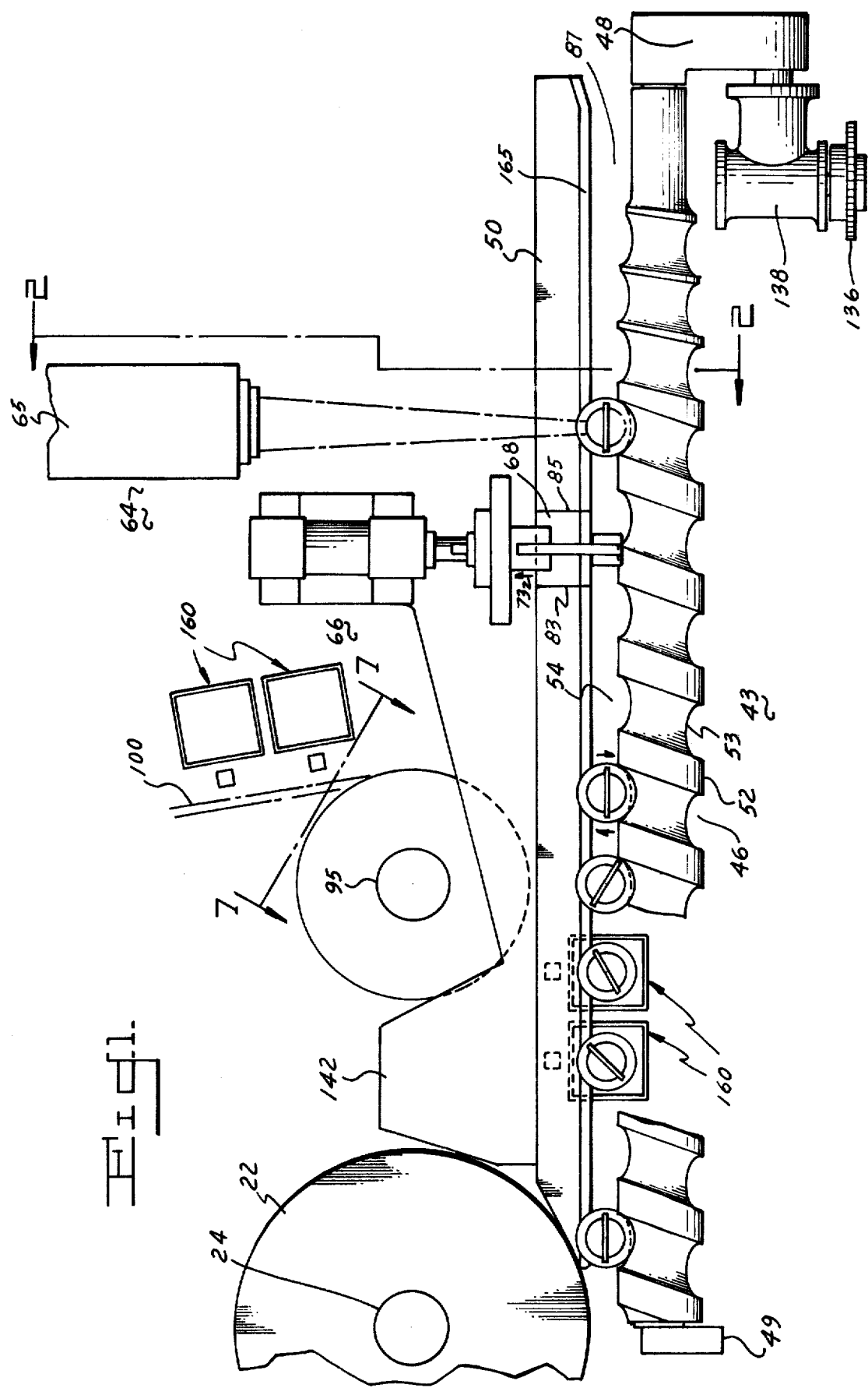

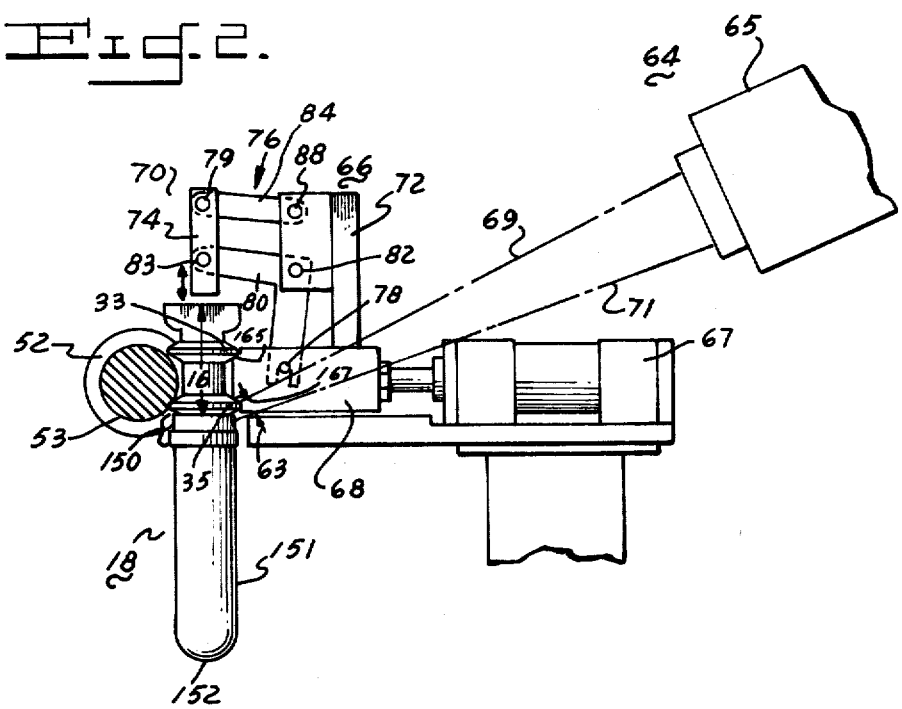
Fig. 2.
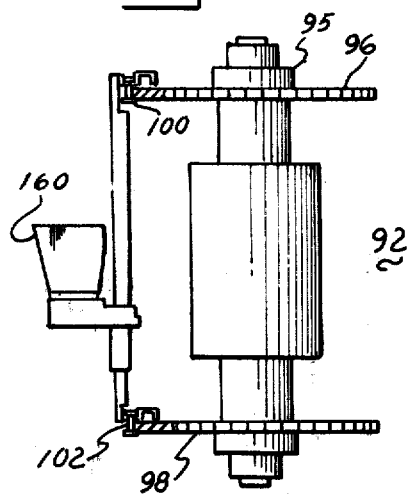
Fig. 7.
Fig. 3.

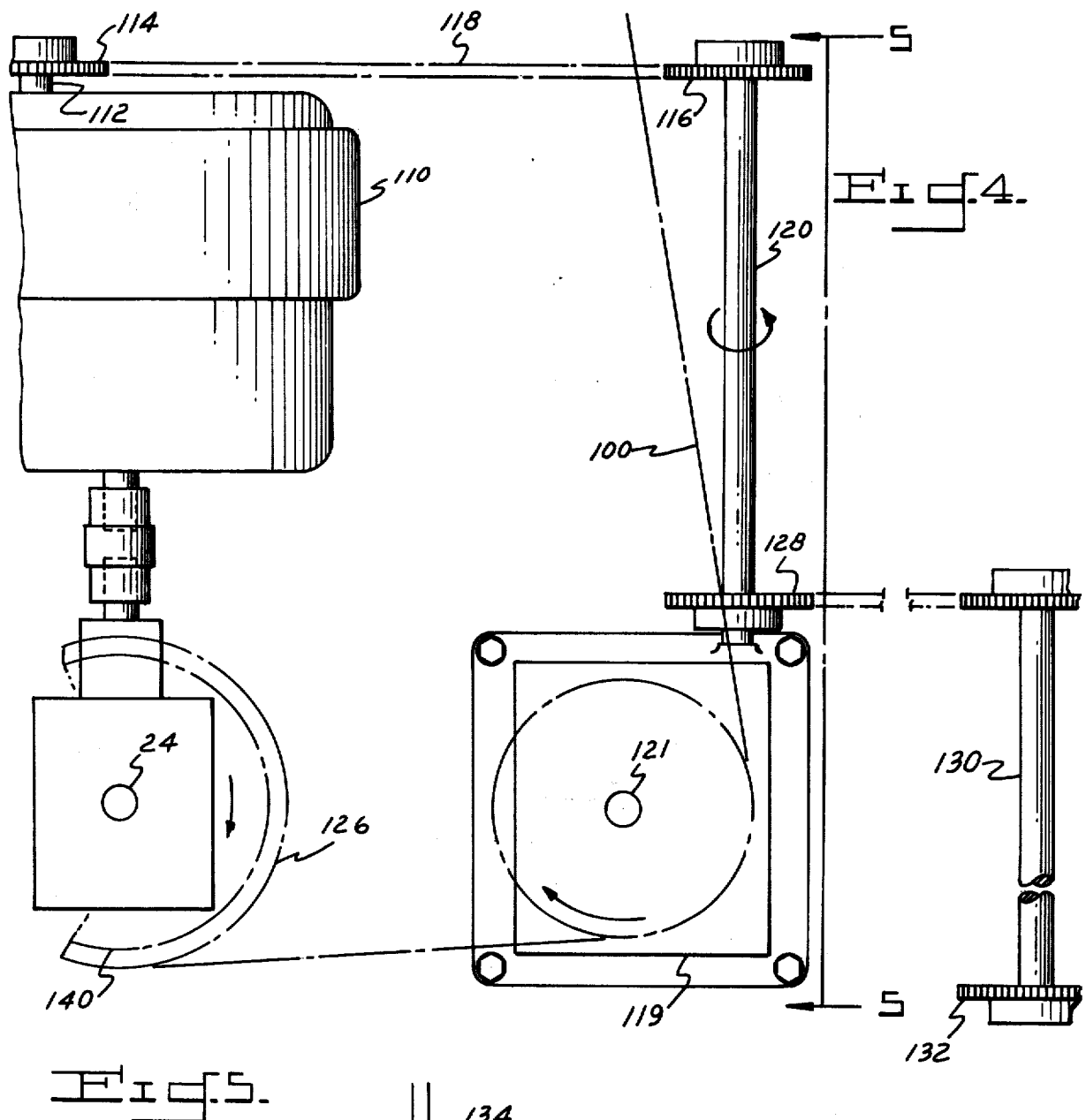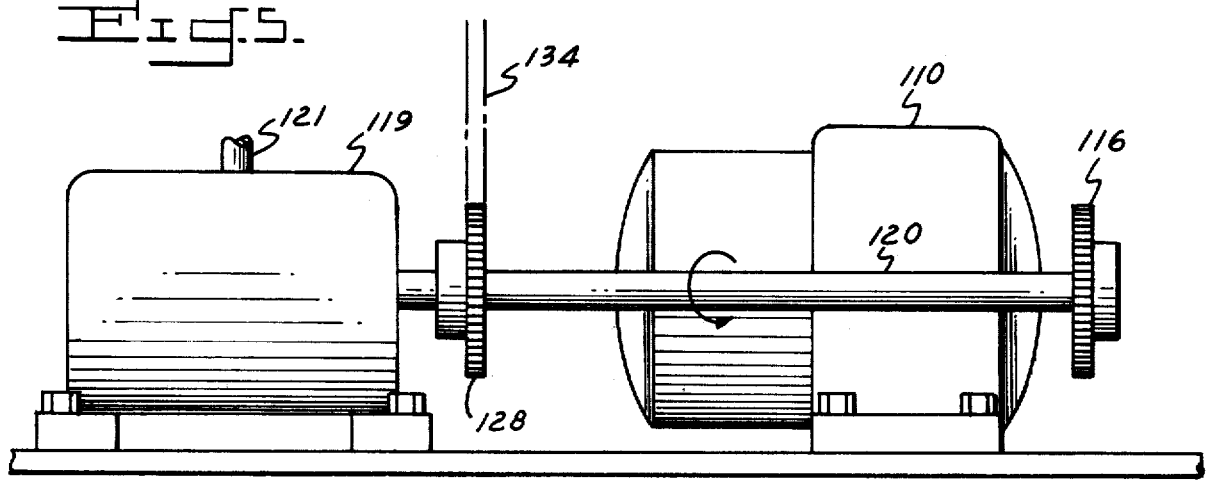

METHOD AND APPARATUS FOR HANDLING AND TRIMMING BLOW MOLDED ARTICLES

CROSS REFERENCES TO RELATED APPLICATIONS

Ser. No. 336,023, filed Feb. 26, 1973.
Ser. No. 418,075, filed Nov. 20, 1973.
Ser. No. 424,866, filed Dec. 14, 1973.

BACKGROUND OF THE INVENTION

This invention relates to deflashing articles and more particularly to removing moil portions from the necks of blow molded thermoplastic preforms wherein the thermoplastic is purposely at elevated temperature during moil removal.

U.S. Pat. No. 3,754,851 discloses forming molecularly oriented containers from blow molded preforms which have been initially shaped from a portion of an extruded hollow parison. In such system it is desirable to retain in the plastic a major part of the heat which was generated during extrusion in order that such heat can be used to provide the temperature which is necessary to produce molecular orientation and allow reshaping of the preform into a finished article in the final blow mold. Therefore, as disclosed in such patent, the preforms are ejected from the mold cavities at an overall average temperature through the wall thickness which is greater than that usually encountered in conventional blow molding where further working is not contemplated and the plastic is usually cooled to the maximum extent while in the cavity in order that it be as rigid as possible on ejection from the mold.

Inherent in practically all blow molded parts formed from a freely extruded parison is the presence of an integral neck moil which represents a short unused part of the parison length extending beyond one end of the blow mold cavity which must be removed before the article can be considered to be in final form. A "tail" portion is also formed along a thin web joint at the opposite end but this is usually broken off without much difficulty and is not of concern herein. The neck moil in the system of the aforesaid patent is desirably removed before final blowing while the plastic in the region of the integrally attached moil is at elevated temperature, since under such conditions it is more pliant than if at lower temperatures when it is quite rigid and more difficult to work. A device for sectioning articles generally found operable in this environment is typically disclosed in U.S. Pat. Nos. 3,406,598 and 3,429,211 and involves the use of a cutting blade penetrating into the object being sectioned at the desired level as it is moved across the blade between fixed and movable guides.

Sectioning articles while at elevated temperature is, however, not without problems. If the plastic is too hot it tends to stretch across the blade without any meaningful penetration through the wall at all, whereas if too low in temperature, in addition to generating wear on the cutting member, the plastic tends to crack, especially if it is brittle and has not been toughened via molecular orientation techniques. When the articles being trimmed are the aforementioned tubular preforms having body portions also at elevated temperature which have been molded with an accurate wall distribution pattern and contour related to that desired in the later formed containers, it is important to avoid or minimize contacting the plastic which will in fact form any part of the finished container prior to final molding since the plastic is hot, will readily deform to the touch and will tend to stick to an adjacent preform should it happen to strike against one during processing in a production line. Also, when such preforms are to be temperature-conditioned in an intermediate station before reshaping, it is highly desirable that they exit the neck moil trimming or deflashing station physically oriented in an attitude which will facilitate passage through such subsequent temperature-conditioning station.

SUMMARY OF THE INVENTION

Now, there has been developed a deflashing system for removing moil portions from molded articles which solves the aforementioned prior art difficulties.

Accordingly it is a principal object of this invention to provide improved method and apparatus for deflashing blow molded articles of thermoplastic material.

Another object is to provide method and apparatus for handling and removing moils from the necks of blow molded thermoplastic articles wherein the plastic is at elevated temperature at the time of removal.

A further object is to provide method and apparatus for removing moil portions from the necks of blow molded thermoplastic tubular, round-ended preforms which are at elevated temperature to facilitate downstream reshaping into molecularly oriented containers.

An additional object is to provide method and apparatus for simplified, troublefree handling of such elevated temperature preforms both before and after neck moil removal.

Yet another object is to provide method and apparatus improvements in a continuous trimming system for removing neck moils from molded plastic articles at elevated temperature which positively segregates the hot articles from each other before trimming, selectively trims only those which are at optimum trimming temperature and synchronously carries each hot, trimmed article away from the trimming station while supporting it only at a very limited area thereof.

A further object of this invention is to provide improvements in apparatus for handling molded articles, some of which are to be segregated.

Other objects of this invention will in part be obvious and will in part appear hereinafter from the description which follows when taken in conjunction with the accompanying drawings.

These and other objects are accomplished in apparatus for deflashing blow molded thermoplastic articles which includes an edge member for slicing through the flash, guide means for the articles during deflashing by the edge member and means for delivering the articles to the guide means, by providing the combination therewith of temperature sensing control means upstream of the edge member for measuring the temperature in the region of the flash and the rest of the article and for generating a signal when such temperature is outside a predetermined range, reject means for ejecting articles before reaching the edge member in response to such signal, and deflashed article support means including a series of moving carrier assemblies for the deflashed articles below the edge member.

The means for delivering articles to the guide means preferably comprises a rotatably mounted screw conveyor and adjacent support bar forming pockets with the turns of the conveyor wherein each article is supported about the flash.

The reject means preferably includes a retractable section of the support bar and, optionally, hammer means for forcibly urging articles out of the path of delivery to the guide means on actuation of the retractable section.

In addition, a process is provided for handling and deflashing blow molded thermoplastic articles at elevated temperature which comprises supplying such untrimmed articles having integral moil portions wherein the thermoplastic material in the region of the moil portion and the rest of each article is within a range defined with respect to the glass transition temperture of the thermoplastic as from about 70°F. less than to about 30°F. greater than such glass transition temperature, slicing through the plastic in such region while within such range to remove the moil portion from the rest of each article and then catching the deflashed articles in holders moving underneath the deflashing station as they fall away by gravity after removal of the moil portions.

In more specific aspects, the articles are preforms which have recently been ejected hot from one or more upstream blow molds and the process provides for sequentially advancing them toward the deflashing station while allowing the plastic to partially equilibrate in temperature through the thickness of the wall in such region, sensing the surface temperature of such region upstream of the deflashing station, determining whether such sensed temperature is within the aforesaid range and then ejecting those untrimmed preforms from the path of advancement toward the deflashing station having a temperature in such region outside this range.

BRIEF DESCRIPTION OF THE DRAWINGS

In describing the overall invention, reference will be made to the accompanying drawings wherein:

FIG. 1 is a plan view of an apparatus portion embodying the invention;

FIG. 2 is a sectional view along 2—2 of FIG. 1;

FIG. 3 is a partially sectioned, elevational view along 3—3 of FIG. 1A;

FIG. 4 is a plan view of a drive train for the apparatus of FIGS. 1-3;

FIG. 5 is an elevational view along 5—5 of FIG. 4;

FIG. 7 is an elevational view along 7—7 of FIG. 1.

DETAILED DESCRIPTION OF THE ILLUSTRATED EMBODIMENTS

Figure 1A:
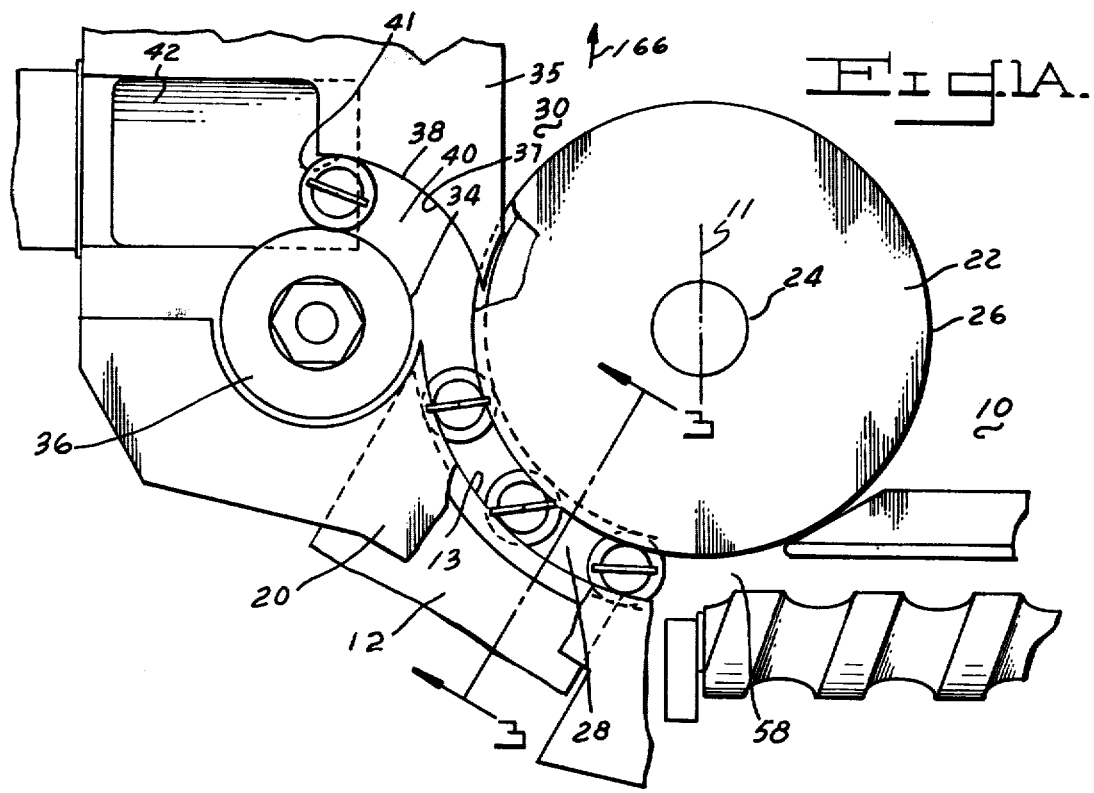
FIG. 1A is a plan view of a continuation of the apparatus of FIG. 1.

Referring now to the drawings, there is illustrated in FIGS. 1A and 3, a deflashing station generally indicated as 10, which includes knife means comprising edge member 12 having protruding sharp edge portion 13 for laterally slicing through flash or neck moil portion 16 previously integrally formed with each article 18. Though the knife means in the illustrated embodiment is fixedly positioned, it likewise could be rotary mounted. Guide means cooperating with flash portion 16 for driving articles 18 into and across edge portion 13 in the manner shown in FIG. 3 include wheel 22 rigidly mounted on a vertical shaft 24 arranged for rotation in a horizontal plane, and fixed, curved deflashing anvil portion 20 opposite and adjacent to wheel 22 above edge member 12, which is shown partially broken away in FIG. 1. Periphery 26 of wheel 22, in the illustrated embodiment, matches the curved contour of deflashing anvil portion 20, both members forming arcuate, moil-cutting path 28 therebetween. The vertical contour 27 of wheel 22 (FIG. 3) at its periphery preferably matches that of moil portion 16, and in the illustrated embodiment includes spaced grooves 29, 31 within which seat flared portions 33 and 35 of neck moil portion 16.

Trimmed flash discharge means (FIG. 1A) generally indicated as 30, are downstream of edge member 12 at the same general elevation as deflashing station 10, and comprise trimmed flash drive or discharge wheel 36 having a periphery 34 forming substantially a continuation of the curved contour of deflashing anvil portion 20. Trimmed flash discharge anvil 35 contoured at 38 to substantially match periphery 34 is spaced opposite wheel 36, both members forming arcuate flash discharge path 40 turning away from wheel 22 of the guide means. Trimmed flash discharge chute 42 beneath end 41 of flash discharge path 40 slopes downwardly away from deflashing station 10 and serves to receive severed moils for recovery and reprocessing.

Means, generally indicated as 43 in FIG. 1, deliver articles to be deflashed to the guide means. In the illustrated embodiment, delivery means 43 comprise elongated screw 46 rotatably mounted in conventional manner via suitable gears and bearings in box 48 and support 49, and adjacent support or restraining bar 50 forming pockets 54 with the turns or flight portions 52 of screw conveyor 46. Root portion 53 of conveyor 46 is preferably contoured as illustrated in FIG. 2 to snugly fit between the spaced flared portions 33 and 35 of neck moil 16. Each article 18 is supported at its flash or moil portion 16 in a distinct pocket 54 as it is urged forwardly while rotating about its vertical axis by flights 52 in a spaced, seriatim pattern toward deflashing station 10 located at the left of screw 46 with respect to FIG. 1. Screw conveyor 46 and restraining bar 50 extend substantially perpendicular to plane 11 (FIG. 1A) through the vertical axis of shaft 24, and together form discharge outlet 58 adjacent the inlet side of moil cutting path 28 where articles 18 to be trimmed are deposited for immediate engagement in grooves 29, 31 of wheel 22 of the guide means.

Temperature sensing control means, generally indicated as 64 (FIGS. 1 and 2), are close to yet upstream of edge member 12 of the knife means, and function to successively measure the temperature of the thermoplastic material of articles 18 being advanced forward by screw conveyor delivery means 43 in the particular region 63 of the joint between flash portion 16 and the rest of article 18, and for generating a control signal when such measured temperature is outside a predetermined range which has been preset into the instrument. Means 64 in the illustrated embodiment includes a sensor, not shown, within housing 65 which is spaced from and out of physical contact with articles 18 for determining the temperature in region 63 by measuring the radiant energy of the plastic emanating from such region. The Williamson Model 4000S infrared thermometer system available from Williamson Corp., 1152 Main St., Concord, Mass. 01742 has been employed successfully in this application. Basically, when the radiant energy emanating from region 63 and measured by the sensor in housing 65 is such as to indicate the temperature is within the desired predetermined range, no control signal is generated, whereas when the energy is such that the temperature is outside such range, the energy is converted into an electrical control signal imposed via conventional circuitry on the coil of a solenoid valve, not shown, mounted in a pressurized air line to fluid motor 67 in FIG. 2. Suitable conventional supports, not shown, may be provided for adjusting the unobstructed line of sight (within window 69–71 in FIG. 2) of the instrument system.

Article reject means, generally indicated as 66 in FIGS. 1 and 2, are operatively situated between temperature sensing control means 64 and the knife means and function to eject articles before reaching edge member 12 in response to the previously mentioned control signal. In the illustrated embodiment, reject means 66 includes segmented portion 68 separately formed from the remainder of support bar 50 as indicated at 83 and 85 in FIG. 1, which is mounted for retraction away from the delivery path of the articles to the guide means in the direction of arrow 73. Reject means 66 may include hammer means generally indicated in FIG. 2 as 70 for forcibly urging articles 18 out of the path of their delivery to the guide means on rearward actuation of retractable section 68 away from support bar 50. Hammer means 70 comprises upright bracket 72, reciprocable plunger 74 above the lateral space (FIG. 1) or delivery path between screw conveyor 46 and retractable section 68, and link means 76 pivoted to retractable section 68, to plunger 74 and to bracket 72 for imparting vertical reciprocable movement to plunger 74 as a result of horizontal movement of retractable section 68 via means such as fluid motor 67 actuated conventionally from a suitable source of pressure, not shown. Link means 76 includes L-shaped drive link 80 pivoted at 82 to bracket 72, at 78 to retractable section 68 and at 83 to plunger 74, plus driven link 84 above L-shaped link 80 which is pivoted at 79 to plunger 74 and at 88 to bracket 72. Reject means 66 further may include an ejected article discharge chute 90 (FIG. 6) substantially coaxially aligned beneath plunger 74 for receiving articles 18 for reclaim which are out-of-temperature specification in region 63.

Deflashed article support means, generally indicated in FIG. 7 as 92, includes carrier assemblies 94 for individual trimmed preforms (FIG. 3) arranged to linearly move substantially coaxially beneath (FIG. 1) each article 18 as it passes across edge portion 13 and which functions to intercept each deflashed article as it falls by gravity away from edge member 12 in a manner to be further described. Such deflashed article support means 92 (FIG. 7) further includes carrier assembly drive shaft 95 coplanar with vertical shaft 24 carrying wheel 22 of the guide means (FIG. 1), sprockets 96 and 98 on shaft 95 spaced from each other at a level vertically below screw conveyor 46 and in meshing engagement with endless chains 100 and 102 to which carrier assemblies 94 are secured. The space between a pair of immediately adjacent carrier assemblies 94 on chains 100 and 102 is equal to that between adjacent preforms 18 and to the pitch of the flights 52 of screw conveyor 46. Further details of deflashed article support means 92 are set forth in commonly assigned copending application Ser. No. 424,866, filed Dec. 14, 1973, the disclosure of which is incorporated herein by reference.

In FIGS. 4 and 5, a drive train is illustrated for the various moving parts of the system just described which is mounted on a suitable support in and out-of-the-way location, for example beneath the apparatus of FIGS. 1–3, 6 and 7. Though separate power units obviously may be used to impart rotation to screw conveyor 46, wheel support shaft 24 and carrier assembly drive shaft 95, it is preferred for simplicity to use a single source of energy. The illustrated system comprises electric motor 110 and associated conventional rotary motion transmitting members which includes output shaft 112 carrying drive sprocket 114 for rotating driven sprocket 116 via chain 118. Driven sprocket 116 fixed on intermediate shaft 120 imparts rotation to the latter which in turn is operatively coupled to upwardly directed right angle gearbox 119 having vertical output shaft 121 conventionally secured to carrier assembly drive shaft 95, thereby transmitting rotary motion to the latter and therefore to chains 100 and 102 which support carrier assemblies 94. The uppermost of such endless chains is schematically shown as 100 in FIG. 4 and in turn meshes with sprocket 126 on shaft 24 (or an extension thereof) which is at a lower level than wheel 22 of the guide means carried on the same shaft. Thus, rotary wheel 22 of the guide means is mechanically linked to and driven by the same members turning the carrier assembly drive shaft 95. Selectively sized sprocket 128 on intermediate shaft 120 rotates driven shaft 130 which has yet another member 132 at its forward end which meshes with upwardly directed chain 134 connected to driven member 136 (FIG. 1) at the upper level of the apparatus, the latter transmitting rotary power via gear boxes 48 and 138 to cause relative rotary movement of screw conveyor 46. Movement of trimmed flash discharge wheel 36 (FIG. 1A) may be conventionally provided from below via a suitable chain and idler sprocket (not shown) driven off sprocket 140 on the power train to the adjacent rotary wheel 22 of the guide means.

Thus, by suitable sizing and selecting the various sprockets, gear boxes etc. of the drive assembly of FIGS. 4 and 5, synchronous motion of carrier assemblies 94, screw conveyor 46 and wheel 22 of the guide means at a predetermined fixed relationship to each other is obtained.

Suitable brackets, mounting plates such as 142 in FIG. 1 and support members may be conventionally used as necessary. Also, chain tensioning mechanisms and shaft torque-limiting devices known to those skilled in the art may be used as necessary, and such conventional parts generally have been omitted for simplicity of description.

In operation, articles such as untrimmed preforms 18 made of thermoplastic material and which comprise finish portion 150 (FIG. 2) immediately beneath neck moil 16 and integral, elongated body portion 151 having rounded bottom end 152 are provided to the system having just been blow molded in an upstream station, for example in the manner generally described in U.S. Pat. No. 3,754,851. The thickness of the wall in region 63, and more specifically at the uppermost surface of finish 150 after removal of moil 16, will vary in accordance with the size of the portion of the finished article which it will eventually form, but generally is between 50 to 250 mils. Though the thermoplastic material may vary, particularly preferred materials which perform well in the present process are those which are structurally amorphous in nature, having a relatively high glass transition temperature range between about 180° to 270°F., being relatively brittle in nature below such glass transition temperature range, especially at normal ambient temperature conditions. Examples of such materials are those wherein a major component of the polymer (at least fifty weight percent) has been polymerized from a monomer selected from the group consisting of acrylonitrile, methacrylonitrile and mixtures thereof. Any suitable comonomer(s) well known to those skilled in the art, such as styrene, which is copolymerizable with such nitrile-based materials may be used. In terms of the process of this invention, in the as-supplied condition immediately after ejection from the blow mold cavity, the plastic in region 63 of attachment of moil portion 16 to finish 150 has a cool outer skin, on the order of about 10 to 20 percent of the total thickness, which is at a temperature approaching the surface temperature of the cavity of the blow mold in which it was formed, and an inner wall, comprising the remainder of the thickness beneath the cool outer skin, which is at a temperature between the skin temperature and the temperature of the plastic in the extruder head where the hollow parison is formed from which preform 18 is blown. Such surface temperature of the blow mold cavity of course will vary, usually with the temperature of the particular mold cooling medium being used, but when water is used for mold cooling this temperature is usually about 35° to 90°F., whereas the extrusion temperature of the plastic is well above the temperature at which substantial molecular orientation occurs on stretching and represents that temperature at which the plastic is molten. For the previously mentioned high nitrile based materials, such extrusion temperature has been found most recently to be within the range of 450° to 520°F.

Preforms 18 are deposited at the inlet end 87 of means 43 between screw conveyor 46 and support bar 50 by any suitable means such as another conveyor along which they are well spaced or even by carefully inserting them manually between such members. The untrimmed preforms thus supported only on their relatively hot moil portions 16 are sequentially advanced toward deflashing station 10 in the manner generally illustrated in FIGS. 1 and 2 while rotating about their vertical axes as a result of frictional rolling contact with flights 52 and bar 50. Support by bar 50 (FIG. 2) is accomplished by having upper and lower flared portions 33, 35 of moil 16 seat in the pair of elongated notches 165, 167 extending along the full length of bar 50. As can be appreciated, the pockets 54 formed between adjacent portions of the screw conveyor flight and opposing surface portions of support bar 50 positively restrain adjacent preforms from touching each other during such sequential, rotating advancement. Thus the plastic of body portion 151 of each preform is isolated from the next adjacent one, and any deformation of the hot, moldable plastic, or sticking together of adjacent units, which might otherwise occur without such separation, for example when one strikes against another, is prevented. The plastic of each article 18 as it passes through the present process can be considered due to its temperature to be lacking in shape-restitution properties if deformed in any way, and this is why such separation is important.

During this sequential advancement toward deflashing station 10, the plastic at least in region 63 is allowed to partially equilibrate in temperature through the thickness of the wall. In other words, the outside skin temperature increases while the inside portion of the wall decreases over that existing on ejection of the part from the blow mold. The temperature in region 63 at this point in the process when trimming is about to take place is quite important, because as mentioned previously, when the plastic is too cool and brittle (e.g., the high nitrile materials) cracking will occur in the area of finish 150 adjacent the trim line, whereas if it is too soft as a result of too high a temperature, the plastic will stretch over sharp edge 13 and pass through deflashing station 10 without full, effective removal of the moil portion. In characterizing the desired temperature in region 63 for a level of stiffness in the plastic adequate for effective trimming in station 10 without cracking the plastic, the average overall temperature through the wall should be greater than the glass transition temperature of the thermoplastic material but not excessively so. Such desired average overall temperature through the wall when characterized with reference to the more conveniently measured actual skin or surface temperature has been found with respect to such surface temperature to lie within the range of about 70°F. less than to about 30°F. greater than the glass transition temperature of the plastic. Such range for high nitrile-based thermoplastic materials is from about 160° to 260°F.

Allowing the temperature of the plastic to partially equilibrate through the wall to provide a temperature pattern different from that existing on ejection from the mold is important because of the manner in which temperature varies with the length of time out of the blow mold. For example, on ejection from the mold, the outer skin temperature has been found to initially increase rather rapidly via conduction from the hotter inside temperature, so that a surface temperature conducive to effective penetration by the cutting edge exists for a rather short interval of only a few seconds, and to trim adjacent the mold at exactly the right time under such circumstances would be rather intractable. On the other hand, the surface temperature does reach a maximum and then decreases rather gradually as equilibration through the wall continues with time as heat is lost to the surroundings, such that in coming down in temperature, the plastic is within a range conducive to effective trimming for a substantially longer period that that covering the period when the surface is rising in temperature to its maximum. For this reason, partial equilibration in temperature through the wall is important, complete equilibration for brittle materials giving a temperature which causes undesirable cracking on sectioning.

Figure 6:
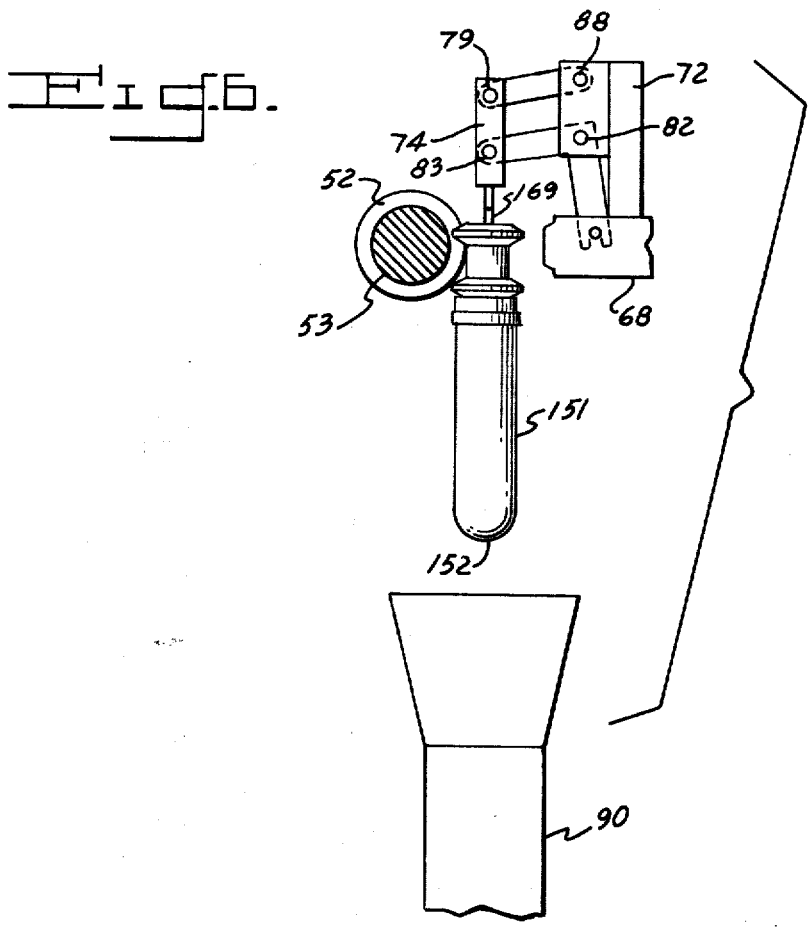
FIG. 6 is a partial, schematic, elevational view of the apparatus of FIG. 2 in its article-reject position.

As the rotating preforms advance toward station 10, region 63 thereof passes across the temperature sensing window 69, 71 of temperature sensing control means 64, upstream of deflashing station 10. At such location, means 64 measures the surface temperature in region 63 and, in the manner previously described, determines whether such measured temperature is within the previously mentioned range of 70°F. less than to 30°F. greater than the glass transition temperature of the plastic. If such measured temperature is within this range, the article continues uninterrupted to the deflashing station, whereas if it is not, temperature-responsive generation of a control signal occurs which is sent to a solenoid valve in a pneumatic air supply line to fluid motor 67 which is mechanically coupled to retractable portion 68 of support bar 50. Such signal causes the piston in the actuator 67 to reciprocate horizontally to the right in FIG. 2, thus momentarily moving segmented portion 68 out of alignment with the rest of bar 50 and therefore out of engagement with flared portions 33, 35 of the moil of that particular article, in order to allow the thus incompletely supported preform to fall by gravity out of the path of advancement toward the deflashing station into chute 90 (FIG. 6) below. When hammer means 66 are used, and which find particular utility in a high speed manufacturing operation wherein the time for something to fall by gravity out of the path of advancement is excessive with respect to the rate at which the articles are being processed, plunger 74 forcibly pushes down on the closed top 169 of the incompletely supported preform as illustrated in FIG. 6, to accelerate its ejection out of the path. Such closed top, of course, is optional and by suitably designing the striking surface of plunger 74, alternative top configurations could be employed.

Preforms having a surface temperature in region 63 within the required range pass into moil cutting path 28 in deflashing station 10 wherein they are rollingly engaged by wheel 22 which urges moil portion 16 into and against edge 13 as shown in FIG. 3 so as to slice through the plastic in region 63 in a substantially lateral direction, thereby severing moil portions 16 from the rest of the articles. Synchronous movement of wheel 22 and screw conveyor 46 prevents any touching of adjacent performs after deposition in cutting path 28, which might otherwise occur as a result of feeding performs into path 28 at a rate greater than that of removal therefrom.

As each now-unsupported trimmed preform falls by gravity away from edge 13 in station 10, it passes through tapering funnel 160 and is caught in a carrier assembly 94 which is in a gravity-receiving position below. Each carrier assembly 94 is being synchronously linearly driven beneath the part at the same velocity by chains 100, 102 from a point where the part approaches the end of the screw conveyor-support bar combination, as illustrated in FIG. 1 where the portion of screw 46 is broken away, through its progress along moil-cutting path 28. Catching is accomplished by interposing holder portion 162 of the carrier assembly which is U-shaped in contour and located at the base of funnel 160, in the path of the falling deflashed preform such that the legs of the U-shaped holder intercept it at ledge portion 164 (FIG. 3), the latter having been formed on preform 18 during prior molding. The position of a preform 18 supported in a carrier assembly 94 is shown in phantom at 170 in FIG. 3. With such an arrangement, support is effectively accomplished yet contact of the part with the support means is confined to the very limited surface area of the ledge at the base of the already final formed finish 150, thereby avoiding any deformation of the hot plastic of the yet to be finished-formed body 151. The loaded carrier assemblies 94 are then conveyed away from station 10 by the continuous planar movement of chains 100 and 102 to the next downstream work station, which is a preferred embodiment comprises a temperature-conditioning environment whereat the plastic through the full wall of the trimmed preform is brought to molecular orientation temperature prior to subsequent finish molding in a further downstream station, not illustrated. Chains 100 and 102 and the carrier assemblies 94 carried thereon move along a closed path and therefore empty assemblies 94 shortly appear again in the position illustrated in FIG. 1 for the start of the next cycle.

The moil portion 16 being removed in deflashing station 10 proceeds onwardly to the exit end of path 28, whereupon it is engaged by the peripheral surface of flash discharge wheel 36 and the work-engaging vertical surfact 37 of flash discharge anvil 35, the latter preferably having the same vertical contour as that of deflashing anvil 20. These members positively frictionally rotatably drive each moil portion 16 away from station 10 toward and eventually into recovery chute 42. Conveying movement of removed moils 16 is preferably in a different, out-of-the-way direction from that of the loaded carrier assemblies which move generally in a horizontal plane in direction 166 in the illustrated embodiment.

If the temperature in region 63 is consistently within the desired range in successive preforms, it may be possible to feed such preforms directly to deflashing station 10 without exposing them to an upstream temperature sensor and article reject mechanism.

Though it is possible to promote temperature equilibration in the plastic in region 63 to the desired level via exposure to ambient temperature surroundings (on the order of 70°F.), this can be accelerated by affirmatively removing heat from the outer surface as it is conductively transferred thereto from the hotter plastic of the inner wall section, for example, by contacting such outer surface with a suitable conventional external liquid fluid heat transfer medium.

The above description and particularly the drawings are set forth for purposes of illustration only and are not to be taken in a limited sense. Various modifications and alterations will be readily suggested to persons skilled in the art. It is intended, therefore, that the foregoing be considered as exemplary only and that the scope of the invention be ascertained from the following claims.

What is claimed is:

1. In apparatus for deflashing blow molded thermoplastic articles which includes:
    A. an edge member for slicing through the flash;
    B. guide means for the articles during deflashing by the edge member; and
    C. means for delivering the articles to the guide means;
    the combination therewith of:
    D. temperature sensing control means upstream of the edge member for measuring the temperature in the region of the flash and the rest of each article and generating a signal when such temperature is outside a predetermined range;
    E. reject means for ejecting articles before reaching the edge member in response to such signal; and
    F. deflashed article support means including a series of moving carrier assemblies for the deflashed articles below said edge member.

2. The apparatus of claim 1 wherein said means for delivering articles to the guide means comprises a rotatably mounted screw conveyor and adjacent support bar forming pockets with the turns of said conveyor wherein each article is supported about the flash.

3. The apparatus of claim 1 wherein said guide means comprises:

a. a fixed, curved deflashing anvil portion above the edge member; and b. a rotary wheel spaced from and having a curvature matching that of the anvil portion.

4. The apparatus of claim 1 wherein said reject means includes a member mounted for retraction away from the delivery path of the articles to the guide means.

5. The apparatus of claim 2 wherein:

said guide means comprises:

a. a fixed, curved deflashing anvil portion above the edge member; and b. a rotary wheel spaced from and having a contour matching that of the anvil portion forming with said anvil portion a moil-cutting path therebetween; and said screw conveyor and support bar having a discharge end immediately adjacent said moil-cutting path.

6. The apparatus of claim 2 wherein:

said guide means comprises:

a. a fixed, curved deflashing anvil portion above the edge member; and b. a wheel mounted on a vertical shaft for rotation in a horizontal plane, said wheel being spaced from the peripherally matching the curvature of the deflashing anvil portion forming with said anvil portion an arcuate moil-cutting path therebetween; and said screw conveyor and support bar extending substantially perpendicular to a plane through the vertical axis of the shaft and having a discharge end adjacent said moil-cutting path.

7. The apparatus of claim 2 wherein said reject means includes a retractable section of the support bar.

8. The apparatus of claim 3 including flash discharge means downstream of the edge member comprising:

a. a trimmed flash drive wheel having a perhiphery forming substantially a continuation of the curved contour of the deflashing anvil portion; and b. a trimmed flash discharge anvil spaced from and having a contour substantially matching that of the trimmed flash drive wheel forming with said trimmed flash drive wheel an arcuate flash discharge path turning away from the rotary wheel of the guide means; and c. a trimmed flash discharge chute beneath the end of said flash discharge path.

9. The apparatus of claim 6 wherein:

said deflashed article support means includes:

a. a carrier assembly drive shaft coplanar with the vertical shaft carrying said wheel;

b. sprockets spaced from each other and secured to said carrier assembly drive shaft at a level vertically below said screw conveyor;

c. endless chains engaging said sprockets for supporting said carrier assemblies; and d. means for imparting rotation to said carrier assembly drive shaft.

10. The apparatus of claim 7 wherein said reject means further includes:

a. hammer means for forcibly urging articles out of the path of delivery to the guide means on actuation of said retractable section, said hammer means comprising:

i. an upright bracket;

ii. a reciprocable plunger above the screw conveyor and retractable section; and iii. link means pivoted to the retractable section, to the plunger and to the bracket, for imparting vertical reciprocable movement to the plunger as a result of horizontal movement of the retractable section.

11. The apparatus of claim 10 wherein said reject means further includes an ejected article discharge chute beneath said plunger.

12. The apparatus of claim 10 wherein said link means includes:

a. an L-shaped drive link pivoted to the bracket and the retractable section; and b. a driven link above the L-shaped link pivoted to the bracket and the plunger.

13. Apparatus for handling and deflashing blow molded thermoplastic articles which are at elevated temperature comprising, in combination:

A. screw conveyor means for successively presenting articles to be deflashed in a spaced, seriatim arrangement;

B. knife means including a sharp edge portion for laterally slicing through a flash portion integral with each article;

C. guide means cooperating with the flash portion for driving the articles presented by the screw conveyor means into and across said edge portion;

D. temperature sensing control means upstream of the knife means for successively measuring the temperature of the articles supplied by the screw conveyor means in the region of the joint between the flash portion and the rest of the article and for generating a control signal when such temperature is outside a predetermined range;

E. article reject means operatively situated between the temperature sensing control means and the knife means for ejecting articles before reaching the edge portion in response to said control signal;

F. deflashed article support means including linearly moving individual carrier assemblies substantially coaxially beneath said articles as they pass across said edge portion for intercepting deflashed articles as they fall by gravity away from said knife means; and G. means for synchronizing motion of the carrier assemblies and of movable portions of said screw conveyor means and guide means.

14. A process for handling and deflashing blow molded thermoplastic preforms at elevated temperature which comprises:

A. supplying untrimmed thermoplastic blow molded preforms having integral moil portions, the thermoplastic material in the region of the moil portion and the rest of each preform having a cool outer skin at a temperature approaching the surface temperature of the cavity of the blow mold and an inner wall at a temperature between the skin temperature and the extrusion temperature of the plastic;

B. sequentially advancing said untrimmed preforms toward a deflashing station while allowing the thermoplastic to partially equilibrate in temperature through the thickness of the wall in said region;

C. measuring the surface temperature of the thermoplastic of the advancing preforms in said region upstream of the deflashing station;

D. determining whether said measured temperature is within a range defined with respect to the glass transition temperature of the thermoplastic as from about 70°F. less than to about 30°F. greater than said glass transition temperature;

E. ejecting untrimmed preforms from the path of advancement toward said deflashing station which have a temperature in said region outside said range; and F. slicing through the plastic in said region of those non-ejected preforms in said deflashing station to remove the moil portions from the rest of the preforms.

15. The process of claim 14 which includes the step of catching the deflashed preforms in holders as they fall by gravity away from the deflashing station after removal of the moil portions.

16. The process of claim 15 which includes supporting the preforms only at their moil portions during sequential advancement toward the deflashing station.

17. The process of claim 15 which includes positively restraining adjacent preforms from touching each other during said sequential advancement.

18. The process of claim 15 wherein catching occurs by interposing said holders in the path of the falling deflashed preforms to intercept them at a ledge formed on such preforms.

19. The process of claim 16 wherein said preforms include a finish portion immediately beneath the moil portion and an integral elongated body portion having a rounded bottom end.

20. The process of claim 16 wherein ejecting comprises momentarily moving a portion of a support member out of engagement with said moil portion to allow the thus incompletely supported preform to fall by gravity out of the path of advancement toward the deflashing station.

21. The process of claim 19 wherein partial equilibration of the plastic in said region is accelerated by affirmatively removing heat from the surface as it is transferred thereto via conduction from the hotter plastic of the wall beneath said surface.

22. The process of claim 20 including the step of pushing the incompletely supported preform downwardly to accelerate its ejection out of said path.

23. A process for handling and deflashing blow molded thermoplastic articles at elevated temperature which comprises:

A. supplying untrimmed blow molded thermoplastic articles having integral moil portions, the temperature of the thermoplastic material in the region of the moil portion and the rest of each article being within a range defined with respect to the glass transition temperature of the thermoplastic material as from about 70°F. less than to about 30°F. greater than such glass transition temperature;

B. slicing through the thermoplastic material in said region while within said range to remove the moil portion from the rest of each article;

C. catching the deflashed articles in holders moving underneath the deflashing station as they fall by gravity away from such station after removal of the moil portions; and D. conveying the holders carrying the deflashed articles away from the deflashing station.

24. The process of claim 23 including the step of positively driving the moil portion just removed from each preform away from the deflashing station toward a scrap recovery area in a different direction from that of the holders carrying the deflashed preforms.

25. The process of claim 23 including the step of suspending the preforms from their moil portions prior to slicing removal of said moil portions.

* * * * *